United States Patent [19]

Kruncos

[11] Patent Number: 4,687,991
[45] Date of Patent: Aug. 18, 1987

[54] TWO AND FOUR CYCLE DIGITAL TACHOMETER

[75] Inventor: Francis E. Kruncos, Fond du Lac

[73] Assignee: Brunswick Corporation, Skokie, Ill.

[21] Appl. No.: 771,216

[22] Filed: Aug. 30, 1985

[51] Int. Cl.$^4$ .............................................. G01P 3/54
[52] U.S. Cl. .................................................. 324/169
[58] Field of Search ............... 324/169, 378, 380, 384, 324/402

[56] References Cited

U.S. PATENT DOCUMENTS

| | | | |
|---|---|---|---|
| 3,095,536 | 6/1963 | Westberg | 324/169 |
| 3,134,943 | 5/1964 | Evenson | 324/169 |
| 3,636,451 | 1/1972 | Westberg | 324/169 |
| 3,781,656 | 12/1973 | Glew | 324/169 |
| 4,010,415 | 3/1977 | Reeves et al. | 324/402 X |
| 4,059,799 | 11/1977 | Faria | 324/169 |
| 4,243,938 | 1/1981 | Bliven et al. | 324/169 |
| 4,251,774 | 2/1981 | Knodler | 324/169 X |

OTHER PUBLICATIONS

"Design of Phase-Locked Loop Circuits", Howard M. Berlin, Howard W. Sams & Co., 4300 West 62, Indianapolis, IN, 1978, pp. 360–367 and FIGS. 7-22.

*Primary Examiner*—Reinhard J. Eisenzopf
*Assistant Examiner*—Jack B. Harvey

*Attorney, Agent, or Firm*—Andrus, Sceales, Starke & Sawall

[57] ABSTRACT

A digital tachometer (2) is provided for two and four cycle internal combustion engines. A transformer (14) senses ignition pulses on the primary lead (6) of the ignition coil (4) of the two cycle engine, and an electrical connector (64) senses ignition pulses at the primary lead post terminal (66) of the ignition coil (54) of the four cycle engine. First and second signal conditioning circuits (50 and 96) are provided for each ignition pulse sensor for polarity immunity, RFI suppression, and transient and overvoltage protection. A precision timer (166) responds to pulses from the signal conditioning circuitry and outputs an output pulse of given delay, and ignores other pulses from the signal conditioning circuitry during the given delay, to protect against transient false triggering, especially in breaker point ignition systems. A phase-locked loop (186) responds to the delay pulses and outputs a pulse train having a frequency which is a function of frequency of the delay pulses. A counter and display circuit (190) counts the pulses in the pulse train as a function of time and displays same to indicate revolutions of the engine per unit time. A battery saver circuit (112) generates a reference voltage from the battery (110) and compares it against the voltage from the signal conditioning circuitry for outputting a turn-on signal to a transistor (154) to connect the battery (110) to various circuit components only above a threshold engine speed.

10 Claims, 1 Drawing Figure 4,687,991

1

TWO AND FOUR CYCLE DIGITAL TACHOMETER

BACKGROUND AND SUMMARY

The present invention provides a digital tachometer for an internal combustion engine having an ignition coil with an input primary low voltage lead and an output secondary high voltage lead.

The invention arose from efforts to develop a reliable and highly accurate tachometer for marine drive engines. It was further desired to provide a universal tachometer usable for both a two cycle engine, such as an outboard drive, and for a four cycle engine, such as a stern drive.

The tachometer of the invention senses pulses on the primary of the ignition coil, to avoid the high voltage and inference present on the secondary lead of the coil. Signal conditioning circuitry is provided to further isolate and condition both four cycle primary pulses and two cycle primary pulses. Further signal conditoning circuitry is provided for ignoring transients and the like, particularly with breaker point type ignitions. A precision timer provides an accurately controlled delay for ignoring false or transient pulses and the like. A phase-locked loop responds to the pulses and outputs a pulse train having a frequency as a function thereof. A counter and display circuit counts the pulses in the pulse train as a function of time and displays same to indicate revolutions of the engine per unit time.

A battery saver circuit is provided for supplying battery power to various components only when the primary pulses provide a voltage above a give threshold corresponding to a given engine speed. This extends battery life. A simple single switch controls both connection/disconnection of the battery in the battery saver circuit and connection of the timing circuitry to either of the two or four cycle conditioning circuitry or to an OFF position. This facilitates ease of user operation.

BRIEF DESCRIPTION OF THE DRAWING

The sole drawing figure is a circuit diagram of a digital tachometer constructed in accordance with the invention.

DETAILED DESCRIPTION

Figure 1:
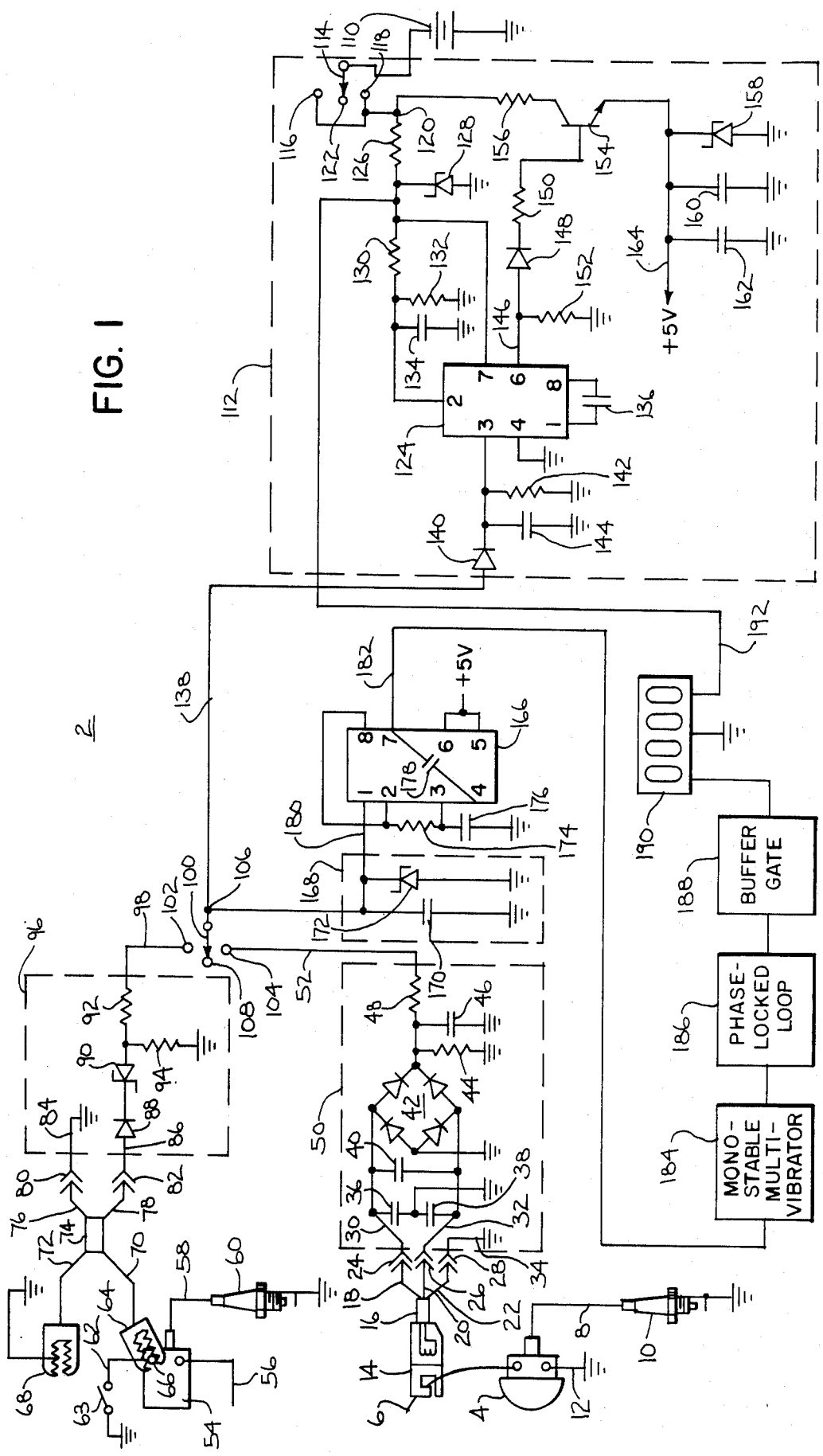

There is shown in the drawing a digital tachometer 2 for an internal combustion engine having an ignition coil such as 4 with an input primary voltage lead 6 and an output secondary high voltage lead 8 connected to a spark plug 10. The coil is typically grounded as at 12. For a two cycle outboard marine engine, a toroid transformer and clip 14 senses the signal on primary lead 6. Clip 14 is a standard type clamp with separable jaws loosely enclosing lead 6, and including for example 34 turns of number 24 wire. Sensing transformer 14 is connected by a shielded cable 16, such as a Belden 8412 shielded connector, providing conductors 18 and 20 connected to each end of the transformer coil, and shield conductor 22. These conductors are connected through respective plug-in type connectors 24, 26 and 28, such as Amp 206153-1, to conductors 30, 32 and 34, respectively, with the latter being grounded.

Conductors 30 and 32 are connected in a signal conditioning circuit including a pair of grounded bypass capacitors 36 and 38 for passing high frequency signals such as RFI out of the system, and hence provide a low pass filter. Another capacitor 40 is provided for conditioning and stabilizing the signal, and eliminating transients and the like. The signal is then passed to a full wave rectifier bridge 42 to provide a positive output regardless of negative or positive polarity input from sensing coupling transformer 14. The signal is then further filtered by resistor 44 and capacitor 46, and the voltage dropped across resistor 48. The signal conditioning circuit is blocked in dashed line as shown at 50, and its output is provided at 52.

Sensing coupling circuitry is also provided for a four cycle marine drive engine, such as in a stern drive having an ignition coil 54 with a primary low voltage lead 56 and an output secondary high voltage lead 58 connected to spark plug 60. The coil is grounded by the other primary lead 62 through an electronic switch or points 63. An alligator type clip 64 is connected to the primary circuit on the point side at terminal post 66 of the coil in conventional manner providing a direct electrical connection. Another alligator type clip 68 is grounded, as by connection to the frame or the like. Conductors 70 and 72 from respective clips 64 and 68 are connected by a cable connector 74, such as a Belden 8412 cable, to respective conductors 76 and 78 which are in turn connected through respective plug-in type connectors 80 and 82, such as Amp 206153-1, to respective conductors 84 and 86, with conductor 84 being grounded. The signal pulses on conductor 86 are half wave rectified by a diode 88, and signals below a given threshold voltage are blocked by reverse zener diode 90 to prevent unwanted signals from entering the circuit. The voltage is then dropped across resistor 92 in a voltage dividing network with resistor 94. The signal conditioning circuit described is shown as blocked in at 96, and provides an output at 98.

A user controlled switch 100 has a pair of inputs 102 and 104 and an output 106. The switch is settable by the user to selectively connect either of inputs 102 and 104 to output 106. The switch also has an OFF position at 108 wherein neither input 102 nor 104 is connected to output 106. Signal conditioning circuit 96 is connected between coupling sensor 64 and switch input 102. Signal conditioning circuit 50 is connected between coupling sensor 14 and switch input 104.

Various of the components in tachometer 2, to be described, are powered by a battery 110. A battery saver circuit is shown at dashed line 112. A user controlled switch 114 selectively connects the battery to either of inputs 116 and 118, each of which is connected to a node 120, or switch 114 may be in an OFF position at 122, whereby switch 114 selectively connects and disconnects battery 110 to node 120. Voltage regulating means are provided between node 120 and a comparator 124 provided by an operational amplifier such as a 3130 IC chip. The voltage at node 120 is dropped across resistor 126 and then clamped to a given value by zener diode 128 and then further dropped through the voltage dividing network provided by resistors 130 and 132, and filtered by capacitor 134 to thus provide a reference voltage for operational amplifier 124. Manufacturer assigned pin designations are shown for the 3130 chip to facilitate clarity. The zener diode clamping voltage is provided as the supply voltage at pin 7, and a compensating capacitor 136 is provided between pins 1 and 8, as is standard for such 3130 chip.

The reference input of operational amplifer 124 is provided at pin 2, as noted. The comparing input of operational amplifier 124 is provided at pin 3 which is connected to the signal conditioning circuitry 96 or 50 at the output 106 of switch 100. Output 106 is connected through conductor 138, diode 140 and an RC charging network, provided by resistor 142 and capacitor 144, to the comparing input at pin 3 of operational amplifier 124. When the frequency and magnitude of pulses through diode 140 are sufficient to charge the voltage of capacitor 144 above the reference voltage at pin 2 of operational amplifier 124, then output pin 6 at conductor 146 goes high, which output is fed through diode 148 and the voltage dividing network provided by resistors 150 and 152 to provide a turn-on signal at the base of transistor 154 to render the latter conductive. The base of transistor 154 is connected by conductor 146 to the output of operational amplifier 124, the collector of transistor 154 is connected through resistor 156 to node 120, and the emitter of transistor 154 is connected through a filtering and clamping network provided by zener diode 158 and capacitors 160 and 162 to provide an output supply voltage at conductor 164, for example +5 volts for powering various components in the tachometer, to be described.

With the user controlled switch 114 in either its up or down ON position, and with the electronic switch provided by transistor 154 being triggered into conduction, current can flow from battery 110 through switch 114 and switch 154 to output 164 to provide supply voltage. With switch 114 it is central OFF position at 122, no battery power is supplied. With transistor switch 154 in its nonconductive OFF state, regardless of the state of switch 114, no battery power is supplied at output 164 to various circuit components, to be described. Transistor 154 is in its nonconductive OFF state when there is no base drive turn-on signal thereto, i.e., when the signal on conductor 146 at output pin 6 is low. Output pin 6 is low when the voltage at comparing input pin 3 is below the voltage at reference input pin 2, which in turn occurs at engine speeds or rpm's below a given threshold.

Switches 100 and 114 are provided together in a double pole double throw user controlled manual switch. Battery 110 is connected and disconnected from the battery saver circuit at node 120 in unison with connection and disconnection of first switch output 106 with signal conditioning circuitry 96 and 50 at inputs 102 and 104. The double pole double throw switch has a central OFF position with switches 114 and 100 connected respectively to points 122 and 108. The double pole double throw switch has an upward ON position with switch 114 connected to point 116 and switch 100 connected to point 102. The double pole double throw switch has a downward ON position with switch 114 connected to point 118 and switch 100 connected to point 104. This operation in unison with a single manual switch facilitates ease of user operation.

A precision timer 166, such as provided by a 2905 IC chip as shown with manufacturer assigned pin designations, is connected to the signal conditioning circuitry 96 or 50 through switch 100 at output 106. A third signal conditioning circuit 168 is connected between the switch output 106 and timer 166, and includes a filter capacitor 170 and a clamping zener diode 172 for voltage protection. Supply voltage for chip 166 is provided at pins 5 and 6 from output 164. A timing constant is provided by the RC network having resistor 174 and capacitor 176, and RFI filtering is provided by capacitor 178. In one particular embodiment, the timing constant is set for two microseconds to eliminate unwanted signals from affecting the remaining counting circuitry. Transient or other unwanted signals may be a particular problem in breaker type ignition systems.

In accordance with the operation of a 2905 chip, when input pin 1 at conductor 180 goes high, for an incoming pulse, then output pin 7 at conductor 182 goes low and stays low for two microseconds, and then goes back high again. During the two microsecond delay interval, output pin 7 stays low regardless of other pulses at input pin 1, i.e., regardless of whether conductor 180 goes low and then back high again. Precision timer 166 thus responds to a pulse from the signal conditioning circuitry and outputs an output pulse of given delay, and ignores other pulses from the signal conditioning circuitry during the given delay, and then outputs another output pulse of given delay in response to the next pulse from the signal conditioning circuitry following the given delay of the first mentioned output pulse. In the particular embodiment in marine applications, transient ignition spikes may be present for up to 1 or 1.5 microseconds after a sensed pulse, especially breaker point ignitions. Precision timer 166 ignores such transients.

The output of timer 166 on conductor 182 is supplied to a monostable multivibrator 184, such as a 4538 IC chip, providing a one shot clean square wave for every input pulse thereto on conductor 182. Phaselocked loop 186 responds to the pulses from monostable multivibrator 184 and outputs a pulse train having a frequency which is a function of the frequency of the delay pulses on conductor 182 through monostable multivibrator 184. Phase-locked loop 186 may be provided by a 4046 IC chip and may include a 40102 divide by n down-counter IC chip, as is known, for example "Design Of Phase-Locked Loop Circuits", Howard M. Berlin, Howard W. Sams and Co., 4300 West 62, Indianapolis, Ind., 1978, pgs. 360–367, and FIGS. 7–22.

As is standard, a different value of n can be programmed to calibrate for different output pulse train frequencies, for example for calibration between two and four cycle engines, and for calibration according to the number of cylinders of a four cycle engine, and so on. The output of phase-locked loop 186 is provided through a buffer gate 188, such as 4011 IC chip providing transition isolation, and then fed to a counter and display circuit 190, such as a Red Lion Controls Ditak V DT500000 LCD display head. Counter and display circuit 190 is a precision counter and crystal control time base with a liquid crystal display, and accumulates incoming pulses in the pulse train through buffer gate 188 from phase-locked loop 186 for a precise interval, for example exactly one second. Immediately at the end of this interval, the accumulated count is transferred and latched into the LCD display. Immediately after transferring the count to the display, the internal counter is reset to zero and begins accumulating a new count. Display head 190 is powered by a supply voltage on conductor 192 from the zener clamped battery voltage reference. The counter and display circuit 190 counts the pulses in the incoming pulse train as a function of time and displays same to indicate revolutions of the engine per unit time.

It is recognized that various alternatives and modifications are possible within the scope of the appended claims.

I claim:

1. A digital tachometer for an internal combustion engine having an ignition coil with a primary low voltage lead and a secondary high voltage lead, comprising:

sensing means for sensing ignition pulses on said primary lead;

signal conditioning means operatively coupled to said sensing means for conditioning and filtering said pulses;

solid state digital timer means operatively coupled to said signal conditioning means and responding to a pulse from said signal conditioning means and outputting an output pulse of given delay, and ignoring other pulses from said signal conditioning means during said given delay, and outputting another output pulse of given delay in response to the next pulse from said signal conditioning means following said given delay of said first mentioned output pulse;

phase-locked loop means operatively coupled to said timer means and responding to said delay pulses from said timer means and outputting a pulse train having a frequency which is a function of the frequency of said delay pulses from said timer means; and counter and display means operatively coupled to said phase-locked loop means and counting pulses in said pulse train as a function of time and displaying same to indicate revolutions of said engine per unit time.

2. A digital tachometer for an internal combustion engine having an ignition coil with a primary low voltage lead and a secondary high voltage lead, comprising:

sensing means for sensing ignition pulses on said primary lead;

signal conditioning means operatively coupled to said sensing means for conditioning and filtering said pulses;

timer means operatively coupled to said signal conditioning means and responding to a pulse from said signal conditioning means and outputting an output pulse of given delay, and ignoring other pulses from said signal conditioning means during said given delay, and outputting another output pulse of given delay in response to he next pulse from said signal conditioning means following said given delay of said first mentioned output pulse;

phase-locked loop means operatively coupled to said timer means and responding to said delay pulses from said timer means and outputting a pulse train having a frequency which is a function of the frequency of said delay pulses from said timer means; and counter and display means operatively coupled to said phase-locked loop means and counting pulses in said pulse train as a function of time and displaying same to indicate revolutions of said engine per unit time, wherein at least some of said means are powered by a battery, and comprising a battery saver circuit comprising:

means operatively connected to said battery for generating a reference voltage therefrom;

comparator means responsive to said signal conditioning means and to said reference voltage for outputting a turn-on signal when voltage from the former rises above the latter; and electronic switch means operatively connected between said battery and said batteery powered means and triggered into conduction by said turn-on signal, and blocking current flow from said battery to said battery powered means in the absence of said turn-on signal.

3. The invention according to claim 2 wherein:

said means for generating a reference voltage comprises a user controlled switch for connecting and disconnecting said battery to a node, and voltage regulating means connecting said node to said comparator means;

said comparator means comprises an operational amplifier having a reference input connected to said voltage regulating means and a comparing input connected in an RC charging network to said signal conditioning means; and said electronic switch means comprises a transistor having one of its emitter and collector connected to said node, its base connected to an output of said operational amplifier, and the other of its emitter and collector connected to said battery powered means.

4. The invention according to claim 1 wherein:

said sensing means comprises:

electrical connector means for connection to the primary lead of the ignition coil of a four cycle engine; and transformer means for operative coupling to the primary lead of the ignition coil of a two cycle engine;

said signal conditioning means comprises:

a user controlled switch having a pair of inputs and an output, and settable by the user to selectively connect either of said inputs to said output;

a first signal conditioning circuit connected between said electrical connector means and one of said inputs of said switch and including zener diode blocking means and resistive voltage dropping means;

a second signal conditioning circuit connected between said transformer means and the other of said inputs of said switch and including a full wave rectifier bridge, capacitive filter means and resistive voltage dropping means; and a third signal conditioning circuit connected between said output of said switch and the input to said timer means and including capacitive filter means and zener diode clamping means.

5. A digital tachometer for both two cycle and four cycle internal combustion engines each having an ignition coil with a primary low voltage lead and a secondary high voltage lead, comprising:

first coupling means for operative coupling to the primary lead of the ignition coil of a four cycle engine;

second coupling means for operative coupling to the primary lead of the ignition coil of a two cycle engine;

a user controlled switch having a pair of inputs and an output, and settable by the user to selectively connect either of said inputs to said output;

first signal conditioning means connected between said first coupling means and one of said inputs of said switch;

second signal conditioning means connected between said second coupling means and the other of said inputs of said switch;

phase-locked loop means operatively coupled to said output of said switch and responding to pulses therefrom and outputting a pulse train having a frequency as a function thereof; and counter and display means operatively coupled to said phase-locked loop means and counting pulses in said pulse train as a function of time and displaying same to indicate revolutions of said engine per unit time.

6. A digital tachometer for both two cycle and four cycle internal combustion engines each having an ignition coil with a primary low voltage lead and a secondary high voltage lead, comprising:

first coupling means for operative coupling to the primary lead of the ignition coil of a four cycle engine;

second coupling means for operative coupling to the primary lead of the ignition coil of a two cycle engine;

a user controlled switch having a pair of inputs and an output, and settable by the user to selectively connect either of said inputs to said output;

first signal conditioning means connected between said first coupling means and one of said inputs of said switch;

second signal conditioning means connected between said second coupling means and the other of said inputs of said switch;

phase-locked loop means operatively coupled to said output of said switch and responding to pulses therefrom and outputting a pulse train having a frequency as a function thereof; and counter and display means operatively coupled to said phase-locked loop means and counting pulses in said pulse train as a function of time and displaying same to indicate revolutions of said engine per unit time, wherein at least some of said means are powered by a battery, and comprising a battery saver circuit comprising:

means operatively connected to said battery for generating a reference voltage therefrom;

comparator means operatively coupled to said output of said user selectable switch and to said reference voltage generating means for outputting a turn-on signal when the voltage from the former rises above the voltage from the latter; and electronic switch means operatively connected between said battery and said battery powered means and triggered into conduction by said turn-on signal, and blocking current flow from said battery to said battery powered means in the absence of said turn-on signal.

7. The invention according to claim 6 comprising a second user controlled switch operatively connected between said battery and a node connecting said reference voltage generating means and said electronic switch means.

8. The invention according to claim 7 wherein said first and second user controlled switches are a double pole double throw switch.

9. The invention according to claim 5 wherein at least some of said means are powered by a battery, and comprising a battery saver circuit comprising a second user controlled switch operatively connected between said battery and said battery powered means, said first and second user controlled switches being a double pole double throw switch for operating said first and second switches in unison.

10. A digital tachometer for two cycle and four cycle internal combustion engines each having an ignition coil with a primary low voltage lead and a secondary high voltage lead, comprising:

first coupling means for operative coupling to the primary lead of the ignition coil of a four cycle engine;

second coupling means for operative coupling to the primary lead of the ignition coil of a two cycle engine;

signal conditioning means comprising:

a user controlled switch having a pair of inputs and an output, and settable by the user to selectively connect either of said inputs to said output;

a first signal conditioning circuit connected between said first coupling means and one of said inputs of said switch and including zener diode blocking means and resistive voltage dropping means;

a second signal conditioning circuit connected between said second coupling means and the other of said inputs of said switch and including a full wave rectifier bridge, capacitive filter means and resistive voltage dropping means;

a third signal conditioning circuit connected to said output of said switch and including capacitive filter means and zener diode clamping means;

solid state digital timer means connected to said third signal conditioning circuit and responding to a pulse therefrom and outputting an output pulse of given delay, and ignoring other pulses from said third signal conditioning circuit during said given delay, and outputting another output pulse of given delay in response to the next pulse from said third signal conditioning circuit following said given delay of said first mentioned output pulse;

monostable multivibrator means operatively coupled to said timer means and responding to a pulse from said timer means and outputting an output pulse;

phase-locked loop means operatively coupled to said monostable multivibrator means and responding to pulses from said monostable mulrivibrator means and outputting a pulse train having a frequency which is a function of the frequency of pulses from said monostable multivibrator means;

buffer gate means operatively coupled to said phase-locked loop means; and counter and display means operatively coupled to said buffer gate means and counting pulses in said pulse train as a function of time and displaying same to indicate revolutions of said engine per unit time.

* * * * *